No. 790,710. PATENTED MAY 23, 1905.
A. P. WEEKS.
HORSE RELEASING MECHANISM.
APPLICATION FILED JAN. 3, 1905.
4 SHEETS—SHEET 1.
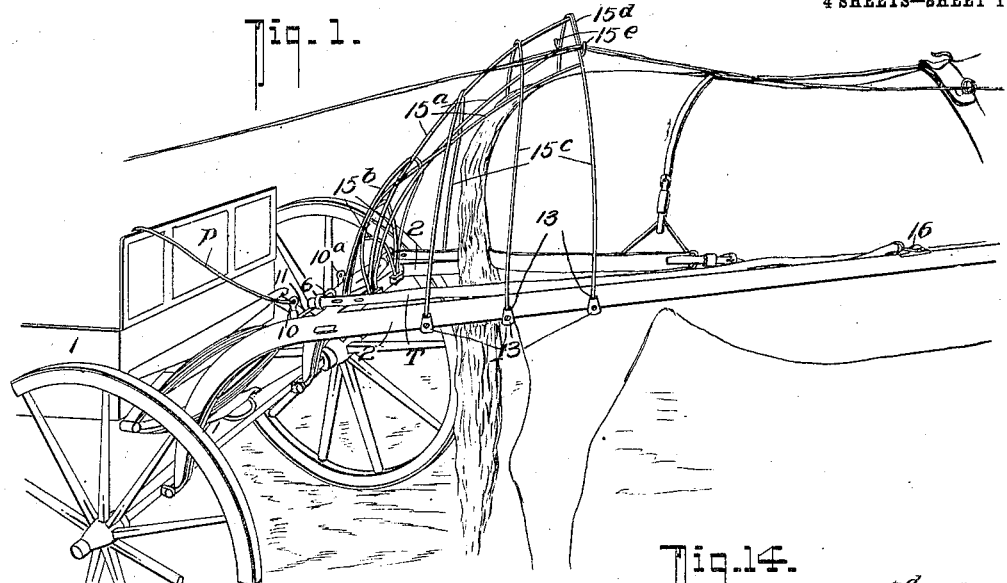
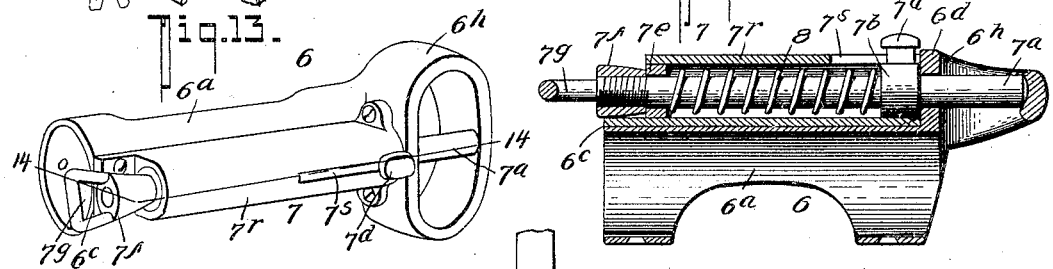
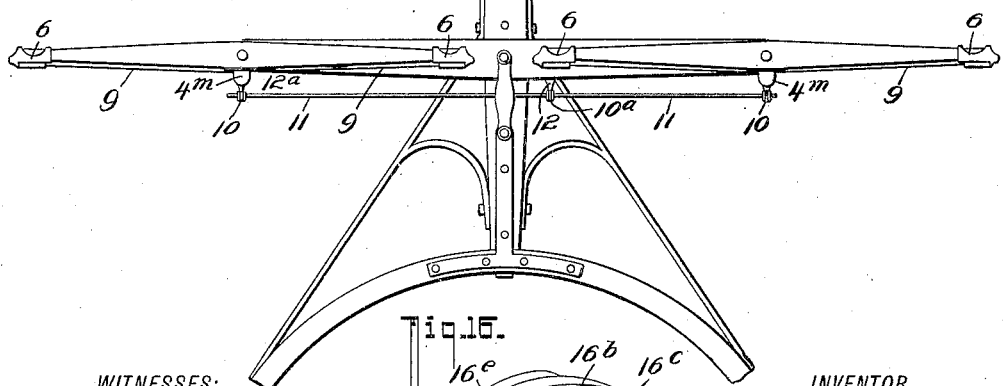
WITNESSES:
F. C. Gibson.
John J. Schrott.
INVENTOR
A. P. Weeks.
BY
Fred G. Dieterich & Co.
ATTORNEYS

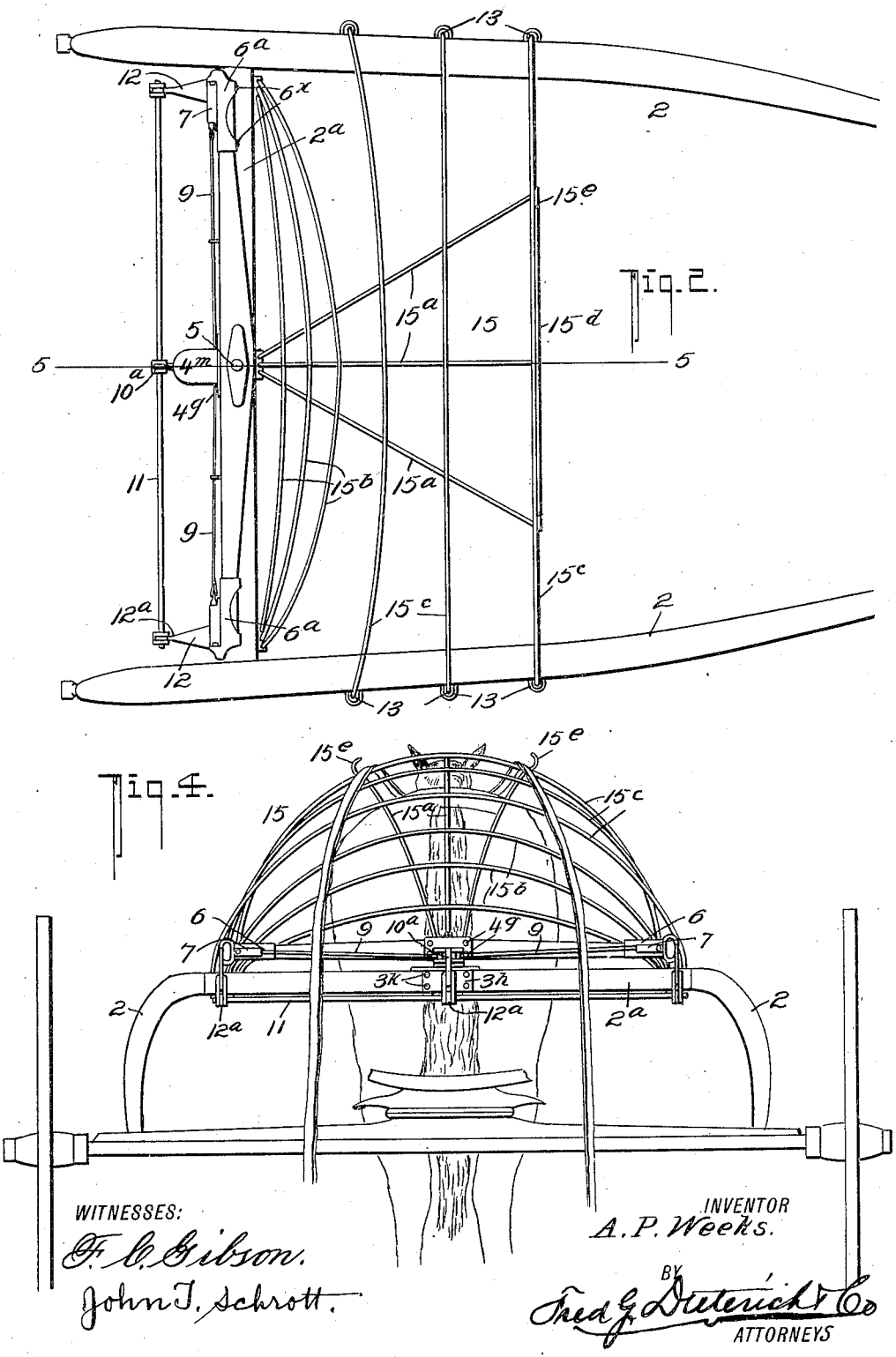

No. 790,710. PATENTED MAY 23, 1905.
A. P. WEEKS.
HORSE RELEASING MECHANISM.
APPLICATION FILED JAN. 3, 1905.
4 SHEETS—SHEET 3.
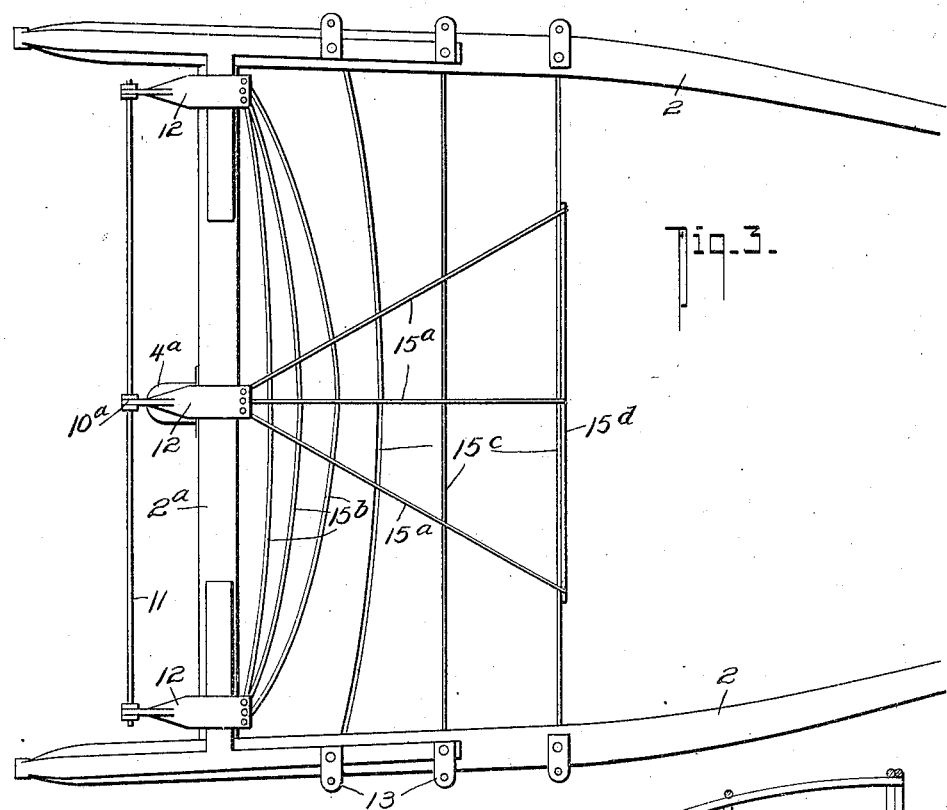
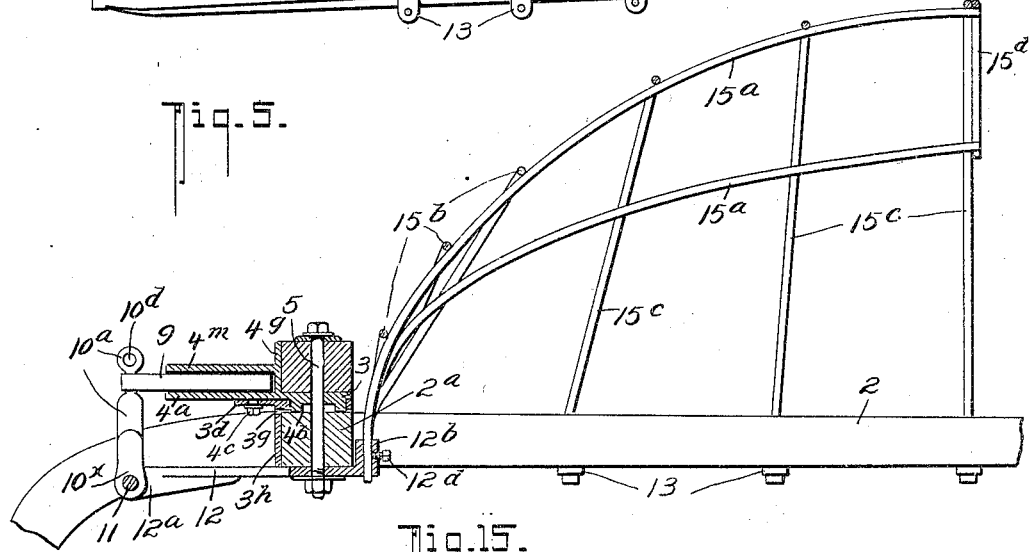
WITNESSES:
F. C. Gibson.
John T. Schrott.
INVENTOR
A. P. Weeks.
BY
Fred G. Dieterich &Co.
ATTORNEYS No. 790,710. PATENTED MAY 23, 1905.
A. P. WEEKS.
HORSE RELEASING MECHANISM.
APPLICATION FILED JAN. 3, 1905.
4 SHEETS—SHEET 4.
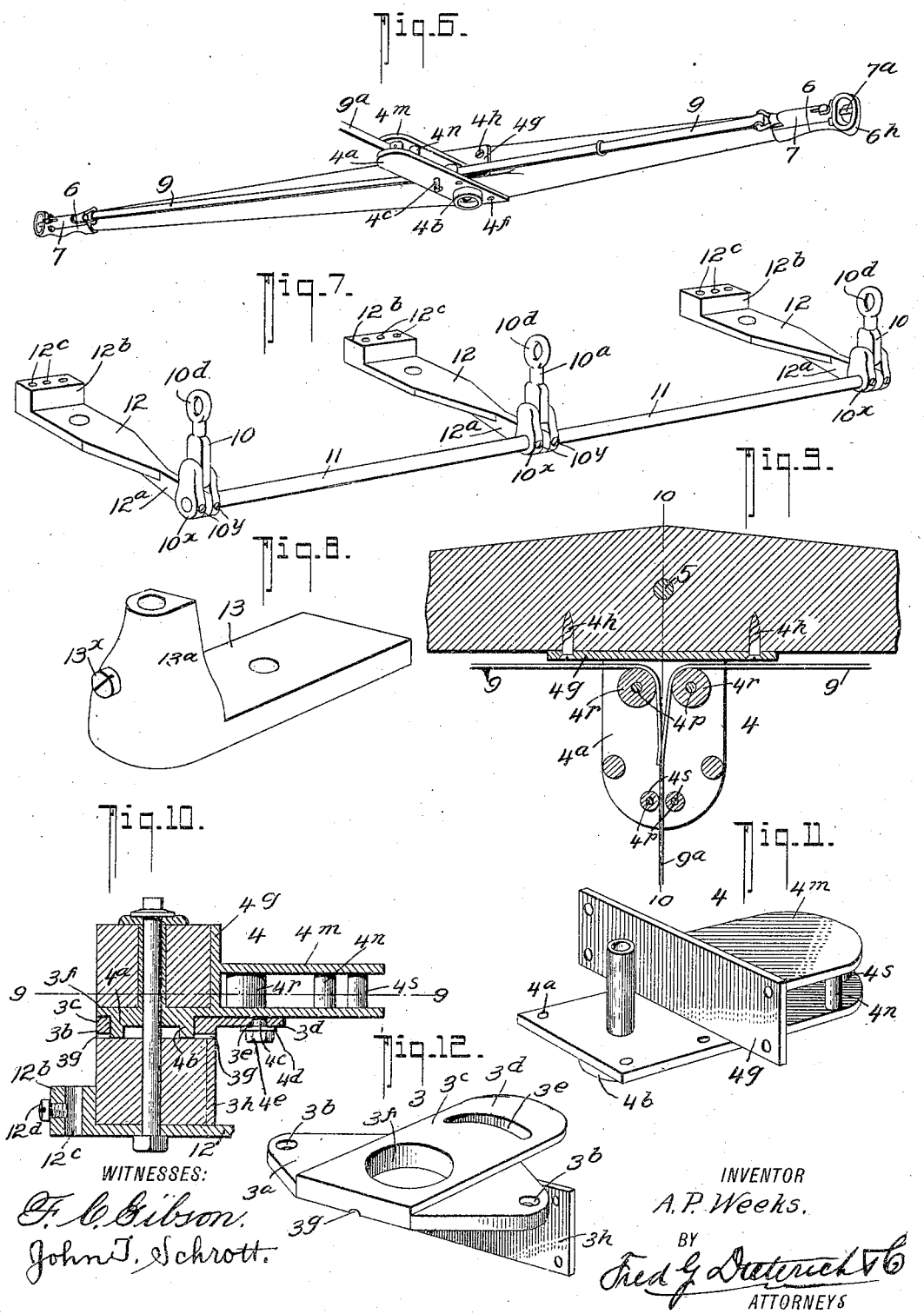
INVENTOR
A. P. Weeks.
BY
Fred G. Dieterich
ATTORNEYS
WITNESSES:
F. C. Gibson.
John T. Schrott.

No. 790,710. Patented May 23, 1905.

UNITED STATES PATENT OFFICE.

ALBION PARIS WEEKS, OF SANTA CRUZ, CALIFORNIA.

HORSE-RELEASING MECHANISM.

SPECIFICATION forming part of Letters Patent No. 790,710, dated May 23, 1905.

Application filed January 3, 1905. Serial No. 239,488.

*To all whom it may concern:*

Be it known that I, ALBION PARIS WEEKS, residing at Santa Cruz, in the county of Santa Cruz and State of California, have invented a new and Improved Horse-Releasing Mechanism, of which the following is a specification.

My invention relates to certain new and useful improvements in mechanism for detaching or releasing horses from vehicles during runaways, &c., to prevent any accident happening to the occupants of the vehicle.

In its generic sense my invention seeks to provide a complete means for guarding against accidents during runaways; and it furthermore has for its object to provide a mechanism of this character of a very simple, effective, durable, and positively-operating construction which will readily, easily, and quickly serve its intended purposes.

Generically, this invention includes means for releasing the traces and means for releasing the holdback-straps from their connection with the vehicle and also for providing means to prevent the shafts or wagon portions from plowing up or entering the ground after the horse is detached from the vehicle.

Again, my invention includes an improved guard for preventing the horse's tail and the reins from entering any of the operating parts of the detaching mechanism. This guard protects the operating parts of the detaching mechanism and prevents them from becoming clogged by the horse's tail and allows the detaching mechanism to operate properly at all times.

Again, my invention seeks to provide a mechanism of the foregoing character which can be operated by one manipulation of the driver to release the horse from its connection with the vehicle, and thereby readily permit the horse detaching himself from the shafts without causing an accident to the occupants of the vehicle.

With other objects in view, which will hereinafter be apparent, the invention also includes certain novel construction, operation, arrangement, and design of parts, all of which will be first described in detail and then be specifically pointed out in the appended claims, reference being had to the accompanying drawings, in which—

Figure 1 is a perspective view of my invention as applied for use. Fig. 2 is a top plan view thereof. Fig. 3 is an inverted plan view thereof. Fig. 4 is a rear view showing my invention in use. Fig. 5 is a vertical longitudinal section on the line 5 5 of Fig. 2. Fig. 6 is a detail perspective view of the whiffletree. Fig. 7 is a similar view of the operating-rod and its bearing members. Fig. 8 is a detail view of one of the guard-attaching members. Fig. 9 is an enlarged horizontal section on the line 9 9 of Fig. 10. Fig. 10 is an enlarged vertical section on the line 10 10 of Fig. 9, the straps 9 $9^a$ being removed. Fig. 11 is a detail perspective view of the roller-carrying pivot-bearing member. Fig. 12 is a perspective view of the pivot-bearing member, which coöperates with the bearing member shown in Fig. 11. Fig. 13 is a detail perspective view of one of the latch-carrying members for the whiffletree. Fig. 14 is a section on the line 14 14 of Fig. 13. Fig. 15 is a detail sectional view of the shaft-runner end, showing the manner of attaching the same to the end of the main shaft. Fig. 16 is an enlarged detail view of the holdback-hook. Fig. 17 is a plan view showing my invention as applied to a double-team vehicle.

Referring now to the accompanying drawings, in which like numerals and letters of reference indicate like parts in all of the figures, 1 designates the vehicle and 2 2 the shafts having the usual cross-brace bar $2^a$, all of which *per se* may be of the ordinary construction. Midway its ends the brace-bar $2^a$ is provided with a bearing member 3, which comprises a horizontally-disposed plate $3^a$, apertured to receive the securing-screws $3^b$ $3^b$. Integrally formed with the plate $3^a$ is a second horizontal plate $3^c$, disposed across and on top of the plate $3^a$, and the plate $3^c$ has a projecting portion $3^d$, provided with a curved slot $3^e$ for the purposes presently understood.

The plates $3^a$ $3^c$ are apertured, as at $3^f$, to receive the bearing-lug $4^b$ of the whiffletree-bearing member 4, hereinafter again referred to. On the under side the plate $3^a$ is provided with drainage-grooves $3^g$ $3^g$, communicating with the aperture $3^f$ to drain off any water, oil, or dirt which may get into the bearing-aperture $3^f$.

Integrally formed with the plate $3^a$ is another plate, $3^h$, which is disposed at right angles to the plate $3^a$ and in a vertical plane. The plate $3^h$ is also apertured to receive the securing-screws $3^k$ $3^k$, by means of which such plate $3^h$ is secured to the brace-bar $2^a$.

4 designates the whiffletree-bearing member, which comprises a plate $4^a$, having an integrally-formed bearing-lug $4^b$ for entering the aperture $3^f$ of the plates $3^a$ $3^c$, and the plate $4^a$ is also provided with a threaded stud $4^c$, which passes through and is movable in the slot $3^e$ of the plate $3^c$ and receives a washer $4^d$ and a securing-nut $4^e$, as clearly shown in the drawings. The plate $4^a$ is secured to the under side of the whiffletree by screws $4^f$ $4^f$ and projects beyond such whiffletree and at right angles to the length thereof.

Integrally formed with the plate $4^a$ is a vertical plate $4^g$, which is secured to the rear of the whiffletree by screws $4^h$ $4^h$.

$4^m$ designates a plate integrally formed with the plate $4^g$ and extending parallel to the plate $4^a$, being spaced from such plate $4^a$ by the distance-pieces $4^n$ $4^n$, as clearly shown in Fig. 10 of the drawings.

Mounted for free rotation between the plates $4^a$ $4^m$ on spindles $4^p$ $4^p$ are a plurality of friction-rollers $4^r$ $4^s$, arranged in pairs, one pair being adjacent the plate $4^g$ and the other pair, $4^s$, being near the end of the plates $4^a$ $4^m$.

A king-bolt 5 passes through the whiffletree, the bearing-lug $4^b$, and the brace-bar $2^a$ to pivotally connect the whiffletree to the brace-bar, the stud $4^c$ and its coöperating slot $3^e$ serving to limit the movement of the whiffletree on its pivot-bolt.

At each end the whiffletree is provided with a trace-receiving catch member 6, each of which catch members 6 comprises a sleeve $6^a$, secured to the whiffletree by the screws $6^x$ $6^x$, as shown. The sleeve $6^a$ includes an integrally-formed brace-receiving eye portion $6^h$ and is formed with a flat face $6^c$ to receive the latch-carrier 7, which comprises a tubular body portion $7^r$, having a longitudinal bore to receive the latch-bolt $7^a$, which bolt also passes through an aperture $6^d$ in the eye $6^h$ and through the apertures in the trace T.

The bolt $7^a$ is provided with a shoulder $7^b$, against which and a block $7^e$ the coil-spring 8, held around the bolt $7^a$, abuts. The spring 8 holds the bolt $7^a$ in its normal or projected position.

$7^d$ designates a finger-piece carried by the bolt $7^a$ and passed through a slot $7^s$ in the member 7. The free end of the bolt $7^a$ is threaded to receive the swivel $7^f$, having an eye $7^g$ to receive the operating-strap 9. The several straps 9 pass around the friction-rollers $4^r$ and are joined together into a single strap-section $9^a$, which passes between rollers $4^s$ and is secured to a lever $10^a$, hereinafter again referred to.

The tubular member 7 and the sleeve 6 may be independently formed and joined together by screws, as shown in the drawings, or they may be cast or formed together, if found desirable.

12 12 designate bracket or holder members adapted to be secured transversely to the under side of the brace-bar $2^a$, and the holders 12 are provided with bearing portions $12^a$ $12^a$ at one end for the reception of the coöperating rod 11, which is rotatably held in such bearing portions $12^a$ $12^a$.

The levers 10 $10^a$ have bifurcated ends $10^x$ $10^x$, apertured to receive the rod 11 and straddle the bearing portions $12^a$ of the holders 12. The levers 10 $10^a$ are secured to the rod 11 by set-screws $10^y$ $10^y$, as clearly shown in Fig. 7 of the drawings. Each lever 10 $10^a$ also includes an eye $10^d$, the middle lever $10^a$ serving to receive the coöperating strap or cord $9^a$, while the eyes of the levers 10 $10^a$ are adapted to receive the pull string or cord P, as clearly shown in Fig. 1. At their other ends the holders 12 12 have bearing-blocks $12^b$, apertured, as at $12^c$ $12^c$, to receive the guard-member rods $15^a$ $15^a$, which are removably held within the apertures $12^c$ of the bearing-blocks $12^b$ by the set-screws $12^d$, as shown.

The guard 15 comprises a plurality of rods arranged longitudinally and transversely in a cage shape, the longitudinal rods $15^a$ $15^a$ being preferably three in number and secured with their ends to the middle holder 12, passing therefrom upwardly and diverging toward the front of the shafts.

$15^b$ $15^b$ designate a plurality of transverse rods, preferably three in number, whose free ends are secured to the end holders 12, and the rods $15^a$ $15^b$ where they cross each other are secured together by welding or otherwise.

$15^c$ $15^c$ designate supplemental transverse curved rods likewise welded or otherwise secured to the rods $15^a$ $15^a$ and held with their free ends in bearing portions in supplemental holders 13, which are secured to the shafts, as clearly shown in Fig. 2 of the drawings. These rods $15^c$ $15^c$ are likewise removably held in their holders by the set-screws $13^x$, as shown.

$15^d$ designates a supplemental rod member secured to the free ends of the rods $15^a$ $15^a$ and bent up at each end, as at $15^e$, to form rein-receiving portions, as clearly shown in Fig. 4 of the drawings.

From practical experience I have found that it is necessary to provide a guard to prevent the reins or the horse's tail from becoming tangled up in the operating parts of the whiffletree and the trace-detaching mechanism, as since without the guard the horse's tail almost invariably becomes tangled up in the operating parts, so that they will not properly work.

16 designates the holdback-hook, which may be of any approved automatic releasing type, and I prefer to use the holdback-hook such as disclosed in my copending application filed on even date herewith and which includes a base member 16ª, adapted to be secured to the vehicle-shafts and formed with a bifurcated hook 16ᵇ. Between the bifurcated portions a latch 16ᶜ is preferably fulcrumed, and the latch 16ᶜ is normally held with its free end against the base 16ª by a spring 16ᵈ pressing against the heel portion 16ᵉ of the latch, as clearly shown in Fig. 16 of the drawings.

17 designates what I term a "sled-runner" for the shaft ends, which comprises a metal casting of a tubular form, which slips over the end of the shaft and is secured thereto by screws 17ª 17ª, as shown. This runner has a curved front edge 17ᵇ curved upward, so that as the shaft ends strike the ground when the horse is detached they will not plow into the ground or run into any ruts, but will ride over the ground, and thereby prevent the too sudden stoppage of the vehicle and the consequent danger of breaking the shafts, as well as endangering the lives of the occupants of the vehicle.

From the foregoing description, taken in connection with the accompanying drawings, the operation of my invention will be readily understood. The driver merely pulls the pull-string, which immediately releases the traces from connection with the whiffletree, and as the holdback-hook is automatic in its operation the horse can then be released and become detached from the shafts, the said shafts then dropping to the ground, and the vehicle as soon as its momentum dies out comes to a standstill. The pull-string may be secured either to the eye of the levers 10 10 or to the eye of the middle lever 10ª, as may be found desirable, thereby allowing for left-handed as well as right-handed drivers.

In Fig. 17 I have shown my invention as applied to double-team vehicles, and in this form the rod 11 runs entirely across, the operation and arrangement of parts being ensentially the same as for single vehicles.

From the foregoing description it will be seen that I have provided a complete detaching mechanism which will let go of any part of the harness and at the same time by merely pulling a single string.

I have also provided means for guarding and protecting the working parts of the detaching mechanism proper from becoming clogged, and thereby rendered inoperative, and I have also provided means for preventing the shaft ends from running into the ground, and thereby endangering the lives of the occupants of the vehicle by either too sudden stoppage or by the breaking of the shafts and the possible upsetting of the vehicle.

From the foregoing it will be seen that I have provided a very simple and durable mechanism for preventing accidents during runaways and the like which will serve its intended purposes, and I believe that from the foregoing description, taken in connection with the accompanying drawings, the complete construction, operation, and many advantages of my invention will be readily understood by those skilled in the art to which it appertains, and I desire to say that slight changes in the detailed construction, combination, and arrangement of parts may be made without departing from the scope of the invention or the appended claims.

Having thus described my invention, what I claim, and desire to secure by Letters Patent, is—

1. An apparatus of the class described comprising in combination with the vehicle-shafts and the whiffletree, means carried by the whiffletree for securing the traces, means for releasing said securing means, a guard for said releasing and said securing means, automatically-releasing holdback-hooks secured to the shafts, and runner-sleeves secured to the shaft ends all being arranged substantially as shown and described.

2. An apparatus of the class described comprising in combination with a vehicle-shaft including a cross-brace, of a whiffletree pivotally connected therewith, means for limiting said pivotal movement of the whiffletree, trace-receiving latch members secured to each end of said tree, means for operating said latch members to release the traces, said means including a rod, holders, having bearings in which said rod is mounted, secured to the brace-bar of the shafts, levers secured to the rod, latch-cords connecting said latches to one of said levers, a pull-cord connected to the other lever, means for guiding said latch-cords to operate in unison, said last-named means comprising friction-rollers carried by the whiffletree, and a guard member secured to the shafts and to the rod-holders substantially as shown and described.

3. An apparatus of the class described comprising in combination with a vehicle-shaft including a cross-brace, of a whiffletree pivotally connected therewith, means for limiting said pivotal movement of the whiffletree, trace-receiving latch members secured to each end of said tree, means for operating said latch members to release the traces, said means including a rod, holders, having bearings in which said rod is mounted, secured to the brace-bar of the shafts, levers secured to the rod, latch-cords connecting said latches to one of said levers, a pull-cord connected to the other lever, and means for guiding said latch-cords to operate in unison, said last-named means comprising friction-rollers carried by the whiffletree, a guard member secured to the shafts and to the rod-holders, and automatically-releasable holdback-hooks secured to the shafts substantially as shown.

4. An apparatus of the class described, comprising in combination with a vehicle-shaft including a cross-brace, of a whiffletree pivotally connected therewith, means for limiting said pivotal movement of the whiffletree, trace-receiving latch members secured to each end of said tree, means for operating said latch members to release the traces, said means including a rod, holders, having bearings in which said rod is mounted, secured to the brace-bar of the shafts, levers secured to the rod, latch-cords connecting said latches to one of said levers, a pull-cord connected to the other lever, and means for guiding said latch-cords to operate in unison, said last-named means comprising friction-rollers carried by the whiffletree, a guard member secured to the shafts and to the rod-holders, automatically-releasable holdback-hooks secured to the shafts, and runner-sleeves secured to the ends of the shafts substantially as shown and for the purposes described.

5. A mechanism of the character stated, comprising in combination with the vehicle-shafts, having a cross-brace bar, a bearing member detachably secured thereto, said bearing member comprising a top plate, a back plate, and top transverse plate having a slot, said top plate having a bearing-aperture, a whiffletree having a bearing portion comprising a bottom plate having a bearing-lug for entering said bearing-aperture, and a stud for entering said slot, said whiffletree bearing member also including a back plate and a supplemental plate spaced from the bottom member, friction-rollers mounted between said bottom plate and said supplemental plate, a pivot-pin passing through said whiffletree and said bearing-plate members, releasing latch members secured to each end of the whiffletree, latch-cords secured to said latch members and passing around said friction-rollers all being arranged substantially as shown and described.

6. A mechanism of the character stated, comprising in combination with the vehicle-shafts, having a cross-brace bar, a bearing member detachably secured thereto, said bearing member comprising a top plate, a back plate, and top transverse plate having a slot, said top plate having a bearing-aperture, a whiffletree having a bearing portion comprising a bottom plate having a bearing-lug for entering said bearing-aperture, and a stud for entering said slot, said whiffletree bearing member also including a back plate and a supplemental plate spaced from the bottom member, friction-rollers mounted between said bottom plate and said supplemental plate, a pivot-pin passing through said whiffletree and said bearing-plate members, releasing latch members secured to each end of the whiffletree, latch-cords secured to said latch members and passing round said friction-rollers, and means for operating said latch-cord to release the members.

7. A mechanism of the character stated, comprising in combination with the vehicle-shafts, having a cross-brace bar, a bearing member detachably secured thereto, said bearing member comprising a top plate, a back plate, a top transverse plate having a slot, said top plate having a bearing-aperture, a whiffletree, a bearing member therefor comprising a bottom plate having a bearing-lug for entering said bearing-aperture, and a stud for entering said slot, said whiffletree bearing member also including a back plate and a supplemental plate spaced from the bottom plate, friction-rollers mounted between said bottom plate and said supplemental plate, a pivot-pin passing through said whiffletree and said bearing members, trace-releasing latch members secured to each end of the whiffletree, latch-cords secured to said latch members and passing round said friction-rollers, and means for operating said latch-cord to release the traces, said latch-cord-operating means comprising a rod, lever members secured thereto, said latch-cord being secured to one of said lever members, holder members having bearings for said rod and a pull-cord secured to the other lever, substantially as shown and described.

8. A mechanism of the character stated, comprising in combination with the vehicle-shafts, having a cross-brace bar, a bearing member detachably secured thereto, said bearing member comprising a top plate, a back plate, a top transverse plate having a slot, said top plate having a bearing-aperture, a whiffletree, a bearing member therefor comprising a bottom plate having a bearing-lug for entering said slot, said whiffletree bearing member also including a back plate and a supplemental plate spaced from the bottom plate, friction-rollers mounted between said bottom plate and said supplemental plate, a pivot-pin passing through said whiffletree and said bearing-plate members, trace-releasing latch members secured to each end of the whiffletree, latch-cords secured to said latch members and passing round said friction-rollers, and means for operating said latch-cord to release the traces, said latch-cord-operating means comprising a rod, lever members secured thereto, said latch-cord being secured to one of said lever members, holder members having bearings for said rod and a pull-cord secured to the other lever, and a guard or cage secured to said bearing members and to the shafts, substantially as shown and described.

9. A mechanism of the character stated, comprising in combination with the vehicle-shafts, having a cross-brace bar, a bearing member detachably secured thereto, said bearing member comprising a top plate, a back plate, a top transverse plate having a slot, said top plate having a bearing-aperture, a whiffletree, a bearing member therefor comprising a bottom plate having a bearing-lug for entering said slot, said whiffletree bearing member also including a back plate and a supplemental plate spaced from the bottom plate, friction-rollers mounted between said bottom plate and said supplemental plate, a pivot-pin passing through said whiffletree and said bearing members, trace-releasing latch members secured to each end of the whiffletree, latch-cords secured to said latch members and passing round said friction-rollers, and means for operating said latch-cord to release the traces, said latch-cord-operating means comprising a rod, lever members secured thereto, said latch-cord being secured to one of said lever members, holder members having bearings for said rod and a pull-cord secured to the other lever, and a guard or cage secured to said bearing members and to the shafts, and automatically-releasable holdback-hooks secured to the shafts, substantially as shown and described.

10. In an apparatus of the character stated, a shaft including a cross-brace, a whiffletree pivotally secured thereto, trace-receiving latch members at each end of the whiffletree, a bearing for said cross member, and a bearing for said whiffletree, said cross-brace bearing comprising a horizontal and a vertical plate having a bearing-aperture and draining-grooves connecting with said bearing-aperture, said horizontal plate also being provided with a projecting portion having a slotway, said whiffletree-bearing comprising a main horizontal plate, a vertical plate and a supplemental horizontal plate, said main horizontal plate having a bearing-lug for entering the bearing-aperture of the horizontal plate of the brace-bearing-member aperture and having a stud for entering said slot, said main and supplemental horizontal plates being spaced apart, friction-rollers mounted therebetween, latch-cords connecting said latches with each other and passing around said rollers, and a supplemental cord passing between said rollers and joined with said latch-cord for operating the same, and means for operating said supplemental cord.

11. In an apparatus of the character stated, a shaft including a cross-brace, a whiffletree secured thereto, trace-receiving latch members at each end of the whiffletree, a bearing for said cross-brace and a bearing for said whiffletree, said cross-brace bearing comprising a horizontal and a vertical plate, said horizontal plate having a bearing-aperture and draining-grooves, connecting with said bearing-aperture, said horizontal plate also being provided with a projecting portion having a slotway, said whiffletree-bearing comprising a main horizontal plate, a vertical plate and a supplemental horizontal plate, said main horizontal plate having a bearing-lug for entering the bearing-aperture of the horizontal plate of the brace-bearing-member aperture and having a stud for entering said slot, said main and supplemental horizontal plates being spaced apart, friction-rollers mounted therebetween, latch-cords connecting said latches with each other and passing around said rollers, and a supplemental cord passing between said rollers and joined with said latch-cord to operate the same, and means for operating said supplemental cord, said last-named means comprising holder members secured to the cross-braces and having bearing portions, a rod mounted in such bearing portions, lever members having bifurcated ends straddling said bearing portions and secured to the rod, said supplemental cord connecting with one of said levers, and means connected with the other lever for rocking said rod, all being arranged substantially as shown and described.

12. In an apparatus of the character stated, a shaft including a cross-brace, a whiffletree secured thereto, trace-receiving latch members at each end of the whiffletree, a bearing for said cross-brace and a bearing for said whiffletree, said cross-brace bearing comprising a horizontal and a vertical plate, said horizontal plate having a bearing-aperture and draining-grooves connecting with said bearing-aperture, said horizontal plate also being provided with a projecting portion having a slotway, said whiffletree-bearing comprising a main horizontal plate, a vertical plate and a supplemental horizontal plate, said main horizontal plate having a bearing-lug for entering the bearing-aperture of the horizontal plate of the brace-member aperture and having a stud for entering said slot, said main and supplemental horizontal plates being spaced apart, friction-rollers mounted therebetween, latch-cords connecting said latches with each other and passing around said rollers, and a supplemental cord passing between said rollers and joined with said latch-cord to operate the same, means for operating said supplemental cord, said last-named means comprising holder members secured to the cross-brace and having bearing portions, a rod mounted in said bearing portions, lever members having bifurcated ends straddling said bearing portions and secured to the rod, said supplemental cord connecting with one of said levers, and means connected with either lever for rocking said rod, and automatically-releasable holdback-hooks secured to the shafts substantially as shown and described.

13. In an apparatus of the character stated, a shaft including a cross-brace, a whiffletree secured thereto, trace-receiving latch members at each end of the whiffletree, a bearing for said cross-brace and a bearing for said whiffletree, said cross-brace bearing comprising a horizontal and a vertical plate, said horizontal plate having a bearing-aperture and draining-grooves connecting with said bearing-aperture, said horizontal plate also being provided with a projecting portion having a slotway, said whiffletree-bearing comprising a main horizontal plate, a vertical plate and a supplemental horizontal plate, said main horizontal plate having a bearing-lug for entering the bearing-aperture of the horizontal plate of the brace-member aperture and having a stud for entering said slot, said main and supplemental horizontal plates being spaced apart, friction-rollers mounted therebetween, latch-cords connecting said latches with each other and passing around said rollers, and a supplemental cord passing between said rollers and joined with said latch-cord to operate the same, means for operating said supplemental cord, said last-named means comprising holder members secured to the cross-brace and having bearing portions, a rod mounted in said bearing portions, lever members having bifurcated ends straddling said bearing portions and secured to the rod, said supplemental cord connecting with one of said levers, means connected with the other lever for rocking said rod, automatically-releasable holdback-hooks secured to the shafts, a guard, and supplemental holders secured to the shafts, said guard being secured to said holders and said supplemental holders, all being arranged substantially as shown and for the purposes described.

ALBION PARIS WEEKS.

Witnesses:
PHILIP FRIDLEY,
CHARLES E. TOWNE.